United States Patent
Pan et al.

(10) Patent No.: US 12,247,597 B2
(45) Date of Patent: Mar. 11, 2025

(54) INPUT DEVICE ASSEMBLY WITH SUPPORT PAD

(71) Applicant: Primax Electronics Ltd., Taipei (TW)

(72) Inventors: Yung-Tai Pan, Taipei (TW); Chun-Che Wu, Taipei (TW); Wen-Chih Chu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 489 days.

(21) Appl. No.: 17/827,410

(22) Filed: May 27, 2022

(65) Prior Publication Data

US 2023/0213046 A1 Jul. 6, 2023

Related U.S. Application Data

(60) Provisional application No. 63/296,079, filed on Jan. 3, 2022.

(51) Int. Cl.
*F16B 1/00* (2006.01)
*G06F 3/039* (2013.01)

(52) U.S. Cl.
CPC ................ *F16B 1/00* (2013.01); *G06F 3/039* (2013.01); *G06F 2203/0333* (2013.01)

(58) Field of Classification Search
CPC ......... G06F 2203/0333; G06F 3/03543; G06F 2203/0332; G06F 3/039; G06F 3/0202; G06F 1/16; G06F 3/0395; G06F 3/033; G06F 3/03549; G06F 2203/0334; A47B 21/0371; A47B 2021/0385; A47B 2021/0378; A47B 2021/0392
USPC ......................................... 345/163, 164, 167
See application file for complete search history.

(56) References Cited

U.S. PATENT DOCUMENTS

| | | | | |
|---|---|---|---|---|
| 6,507,335 B1 * | 1/2003 | Von Ilberg | .......... | G06F 3/03543 345/160 |
| 6,921,054 B2 * | 7/2005 | Doan | .................. | G06F 3/03543 248/118 |
| 2003/0169236 A1 * | 9/2003 | Crocker | ................ | G06F 3/0202 345/168 |
| 2007/0125913 A1 * | 6/2007 | Miller | ................ | G06F 3/03543 248/118 |
| 2009/0303183 A1 * | 12/2009 | Chen | ...................... | G06F 3/039 345/163 |

FOREIGN PATENT DOCUMENTS

| | | | | |
|---|---|---|---|---|
| CN | 2508294 Y | * | 7/2001 | |
| DE | 10259009 B3 | * | 7/2004 | ........... G02B 21/242 |

\* cited by examiner

*Primary Examiner* — Koosha Sharifi-Tafreshi
(74) *Attorney, Agent, or Firm* — KIRTON McCONKIE; Evan R. Witt

(57) ABSTRACT

An input device assembly with a support pad is provided. The input device assembly includes the support pad and an input device. The support pad includes a first main body and a first magnetic attraction element. The first main body has a first bottom surface and a first curvy surface. The input device includes a second main body and at least one second magnetic attraction element. The second main body has a second bottom surface and a second curvy surface. The first curvy surface of the support pad is contactable with one of plural portions of the second curvy surface of the input device. The first magnetic attraction element and one of the at least one second magnetic attraction element are magnetically attracted by each other. Consequently, the support pad is in close contact with the input device.

12 Claims, 13 Drawing Sheets

INPUT DEVICE ASSEMBLY WITH SUPPORT PAD

CROSS-REFERENCE TO RELATED APPLICATION

This application claims priority to U.S. Provisional Patent Application No. 63/296,079 filed Jan. 3, 2022, the contents of which are incorporated herein by reference.

FIELD OF THE INVENTION

The present invention relates to an input device assembly, and more particularly to an input device assembly with a support pad.

BACKGROUND OF THE INVENTION

Generally, an input device assembly includes for example a mouse, a trackball, a joystick, or the like. When the input device assembly is used, the user is usually suffered from hand fatigue. Moreover, the prolonged use of the input device assembly may cause discomfort or even injury of the user' hand. For solving the above problems of using the input device assembly, a support pad is additionally used to support the elbow or the wrist of the user.

In accordance with a conventional design, the support pad is integrated into the input device assembly. However, this design still has some drawbacks. For example, since the support pad is fixedly connected with the main body of the input device assembly, the relative angle or position between the support pad and the main body of the input device assembly cannot be adjusted by the user at will. Moreover, this design cannot meet the requirements of both of the left-handed user and the right-handed user.

In accordance with another conventional design, the support pad is separated from the main body of the input device assembly. Since the input device assembly is frequently moved by the user, the relative angle or position between the support pad and the main body of the input device assembly is frequently changed. After the input device assembly has been used for a certain time period, the support pad needs to be adjusted to the proper position. Under this circumstance, the burden on the user is increased. In other words, this design is not user-friendly.

SUMMARY OF THE INVENTION

For overcoming the drawbacks of the conventional technologies, the present invention provides an input device assembly with a support pad. The input device assembly includes an input device and the support pad. The support pad and the input device are combined together through magnetic attraction. The relative angle between the support pad and the input device is adjustable. Consequently, the wrist of the user can be properly supported. Moreover, this design can meet the requirements of the left-handed users and the right-handed users.

In accordance with an aspect of the present invention, an input device assembly is provided. The input device assembly includes a support pad and an input device. The support pad includes a first main body and a first magnetic attraction element. The first main body has a first bottom surface and a first curvy surface. The input device includes a second main body and at least one second magnetic attraction element. The second main body has a second bottom surface and a second curvy surface. The first curvy surface of the support pad is contactable with one of plural portions of the second curvy surface of the input device. The first magnetic attraction element and one of the at least one second magnetic attraction element are magnetically attracted by each other. Consequently, the support pad is in close contact with the input device.

In an embodiment, the at least one second magnetic attraction element of the input device includes plural magnetic attraction elements, and the plural magnetic attraction elements are arranged along a curvy profile.

In an embodiment, the first magnetic attraction element is a magnet, and each of the plural second magnetic attraction elements is another magnet or a magnetic conductor.

In an embodiment, the first magnetic attraction element is a magnet, and each of the at least one second magnetic attraction element is a magnetic conductor. The at least one second magnetic attraction element is disposed on an inner side of the second curvy surface. The first magnetic attraction element and one of plural portions of the at least one second magnetic attraction element are magnetically attracted by each other.

In an embodiment, the support pad further includes a protrusion post, and the input device further includes a guiding groove. The protrusion post is protruded externally from the first curvy surface. The guiding groove is inwardly and concavely formed in the second curvy surface. The protrusion post is movable within the guiding groove.

In an embodiment, the first magnetic attraction element is disposed within the protrusion post, and the at least one second magnetic attraction element is disposed within an inner side of the second main body and located near the guiding groove.

In an embodiment, the first magnetic attraction element is a magnet, and each of the at least one second magnetic attraction element is another magnet or a magnetic conductor.

In an embodiment, the first magnetic attraction element is the magnet, and each of the at least one second magnetic attraction element is the magnetic conductor. The at least one second magnetic attraction element is disposed within an inner side of the guiding groove. The first magnetic attraction element and one of plural portions of the at least one second magnetic attraction element are magnetically attracted by each other.

In an embodiment, two stopping structures are respectively formed on the two ends of the guiding groove. Moreover, a movable range of the protrusion post within the guiding groove is limited by the stopping structures.

In an embodiment, the support pad further includes a hook, and the input device further includes a guiding groove. The hook is protruded externally from the first bottom surface. The guiding groove is inwardly and concavely formed in the second bottom surface. The hook is inserted into the guiding groove. Consequently, the support pad and the input device are not separated from each other.

In an embodiment, the first main body of the support pad further includes a first alignment mark, and the second main body of the input device further includes plural second alignment marks.

In an embodiment, the at least one second magnetic attraction element of the input device includes plural magnetic attraction elements, and the plural magnetic attraction elements are respectively aligned with the corresponding second alignment marks.

In an embodiment, the first magnetic attraction element is a magnet, and each of the at least one second magnetic attraction element is another magnet or a magnetic conductor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. In the following embodiments, the technical features of the present invention and the achievable technical effects will be described.

The present invention provides an input device assembly with a support pad. Especially, the support pad can be adjusted to a specified angle.

Figure 1:
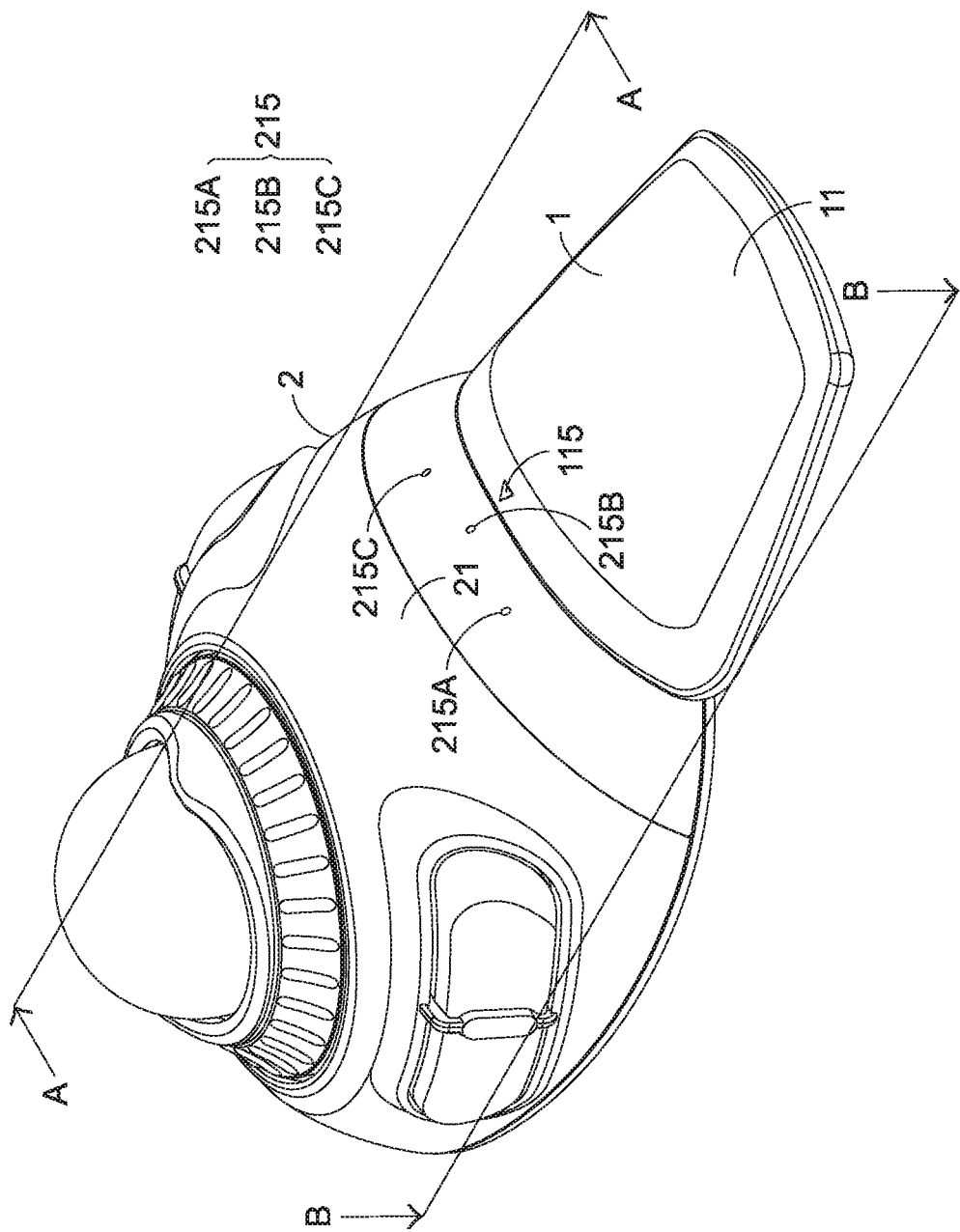
FIG. 1 is a schematic perspective view illustrating an input device assembly with a support pad according to a first embodiment of the present invention.
Figure 2:
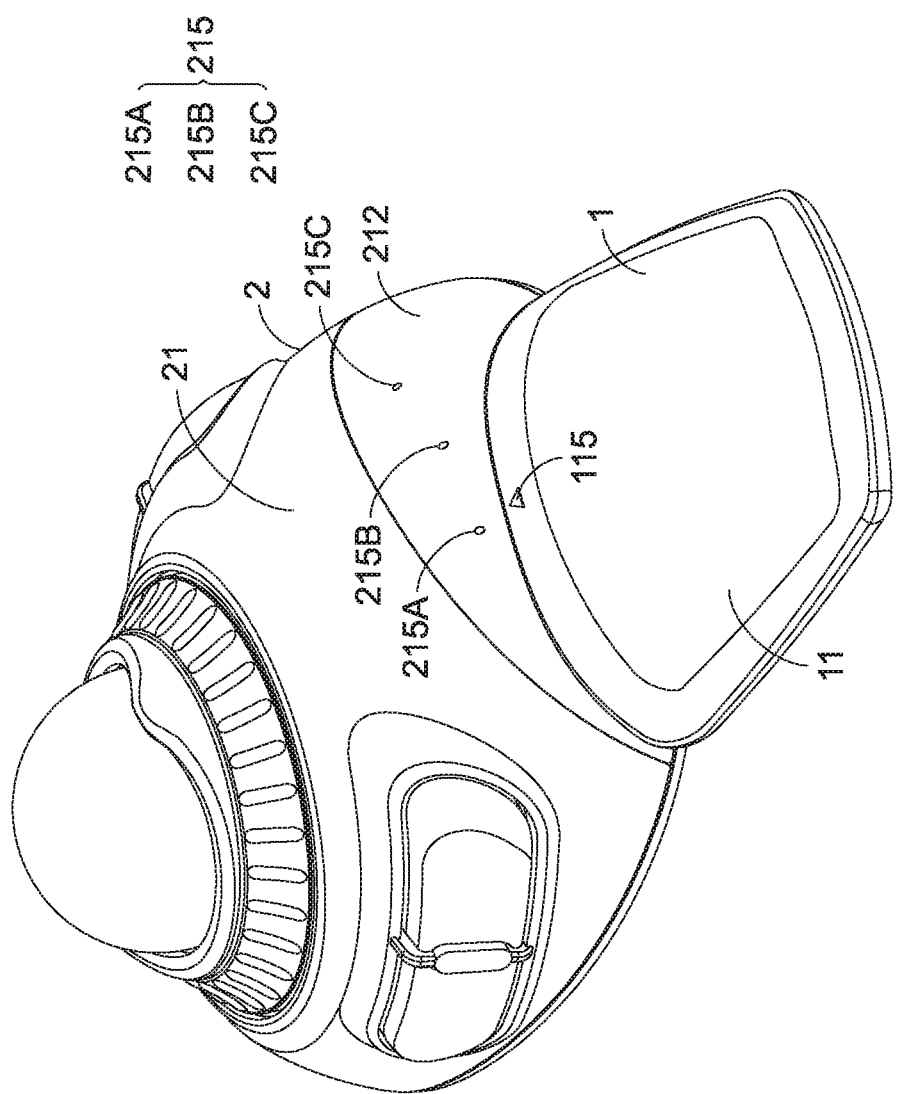
FIG. 2 is a schematic perspective view illustrating the input device assembly as shown in FIG. 1, in which the support pad is shifted by 20 degrees in the clockwise direction and attached on the input device.
Figure 3:
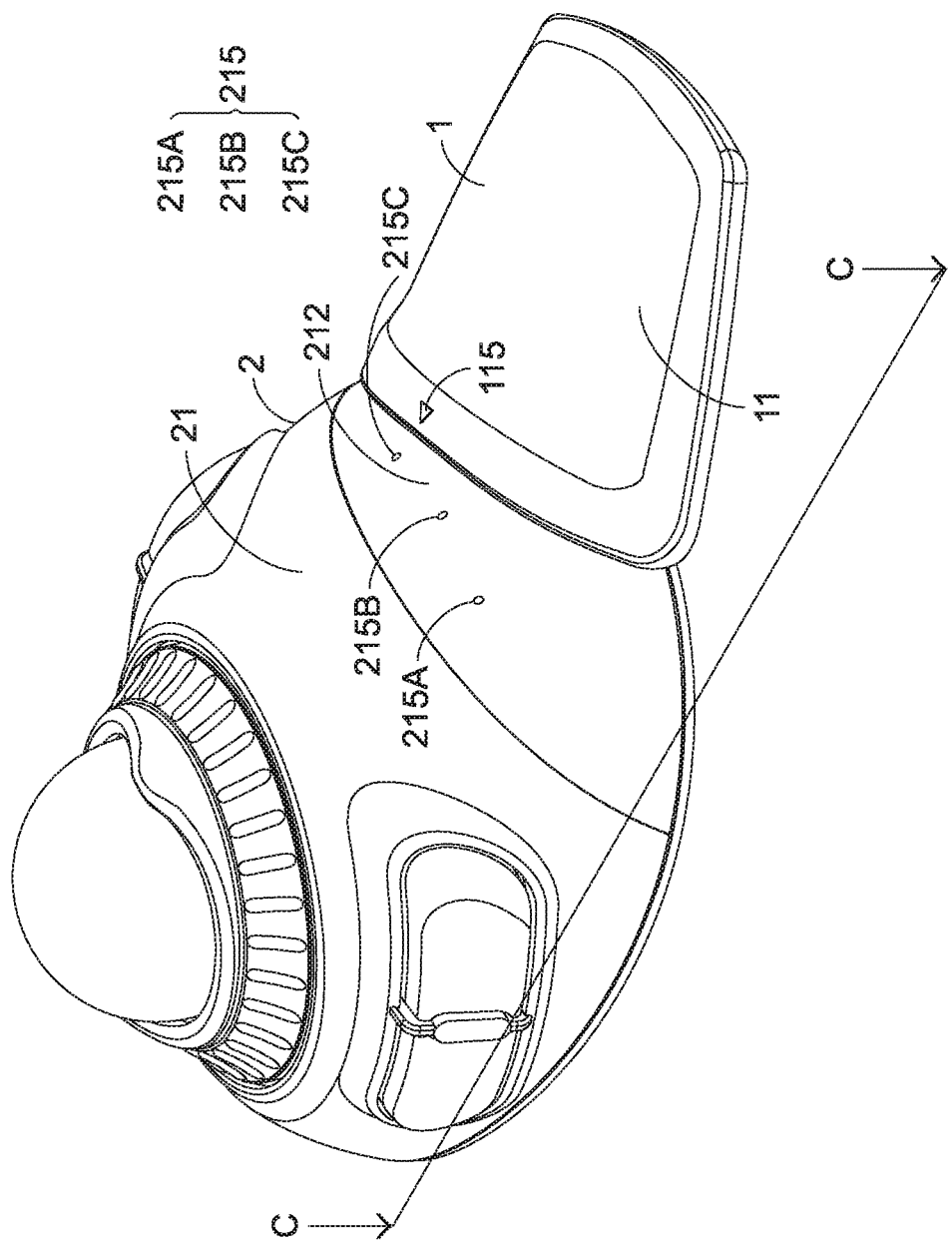
FIG. 3 is a schematic perspective view illustrating the input device assembly as shown in FIG. 1, in which the support pad is shifted by 20 degrees in the counterclockwise direction and attached on the input device.
Figure 4:
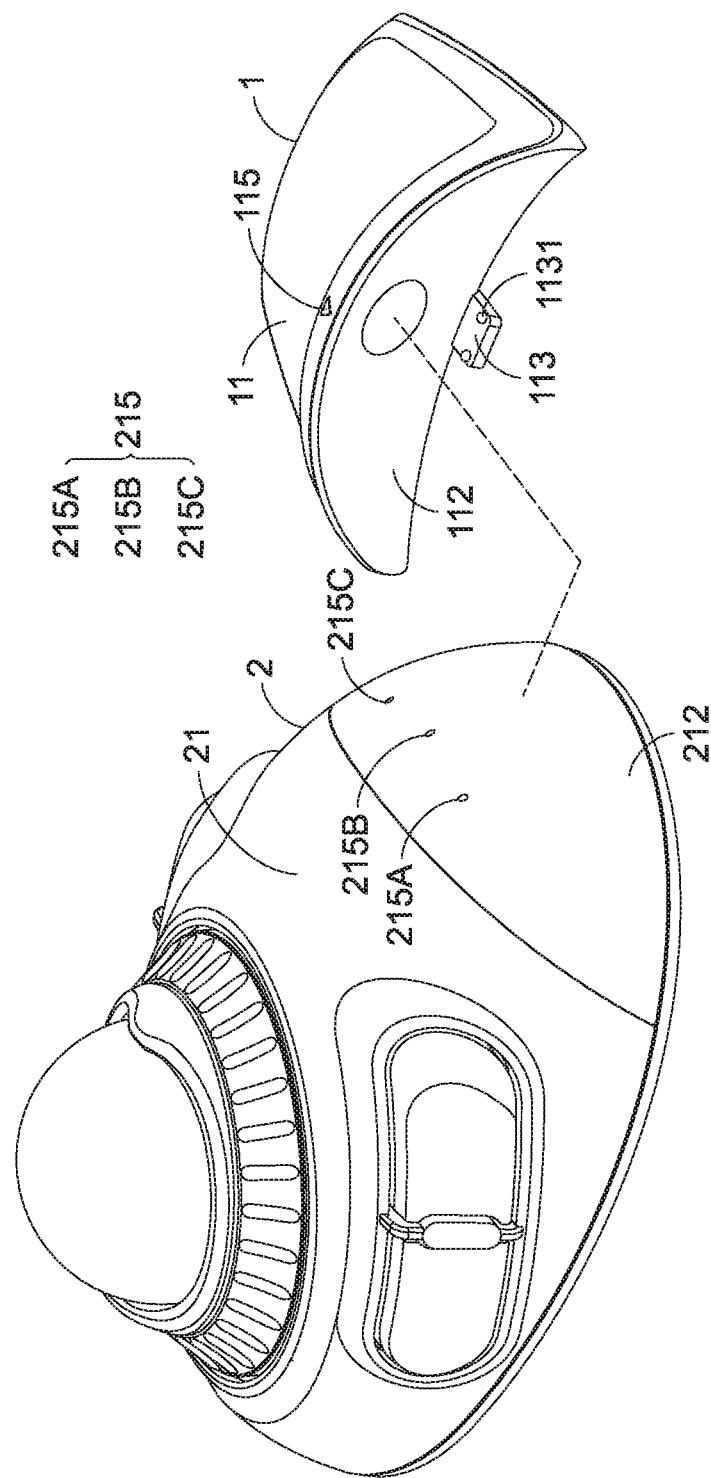
FIG. 4 is a schematic perspective view illustrating the input device assembly as shown in FIG. 1, in which the support pad is separated from the input device and taken along a viewpoint.
Figure 5:
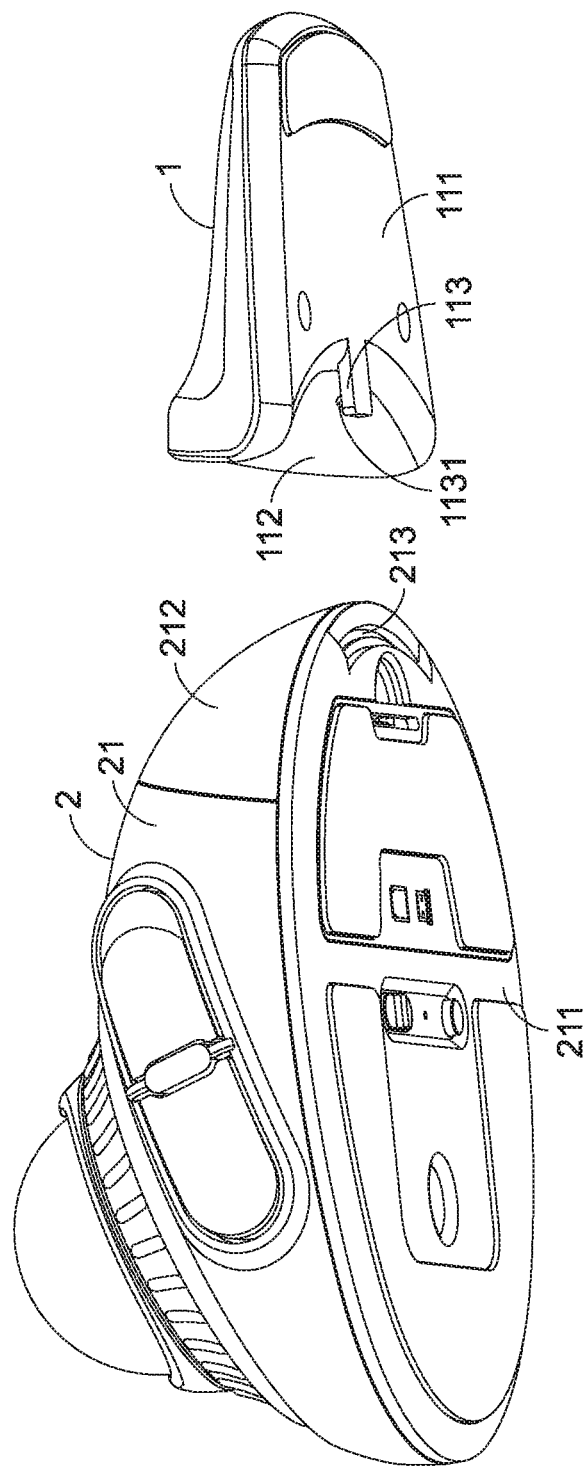
FIG. 5 is a schematic perspective view illustrating the input device assembly as shown in FIG. 1, in which the support pad is separated from the input device and taken along another viewpoint.
Figure 6:
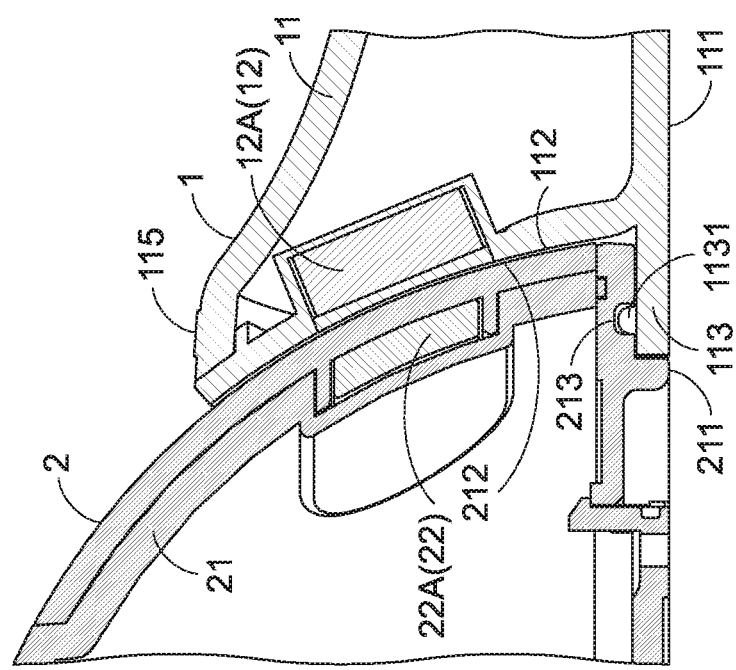
FIG. 6 is a schematic cross-sectional view illustrating portions of the input device and the support pad of the input device assembly as shown in FIG. 1 and taken along the line A-A.
Figure 7:
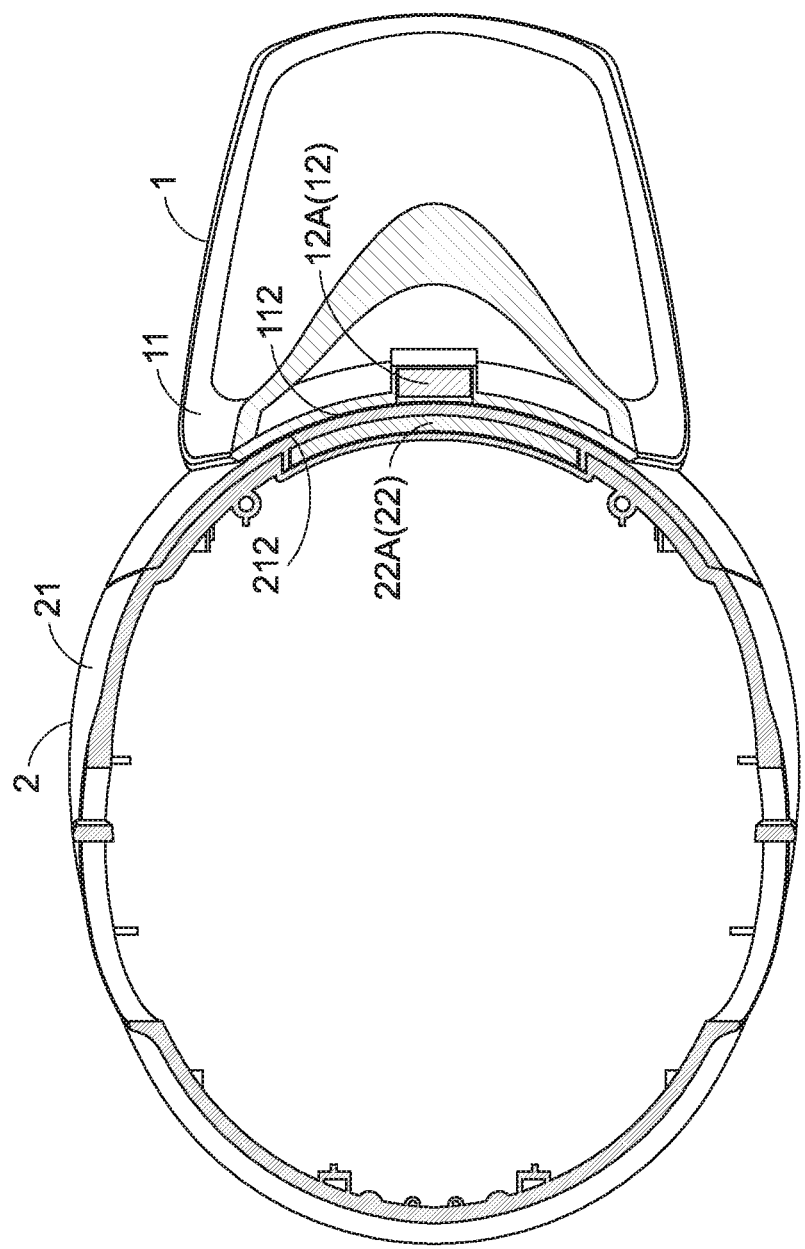
FIG. 7 is a schematic cross-sectional view illustrating portions of the input device and the support pad of the input device assembly as shown in FIG. 1 and taken along the line B-B.
Figure 8:
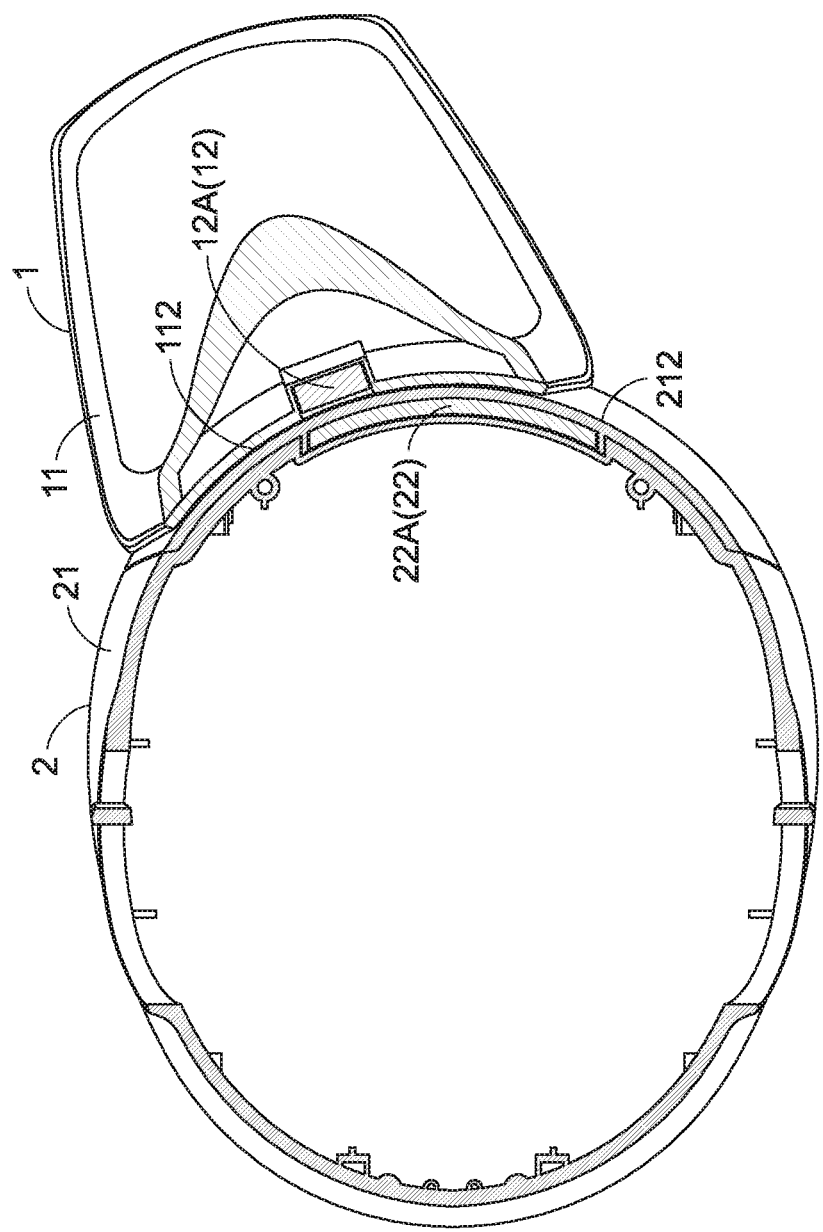
FIG. 8 is a schematic cross-sectional view illustrating portions of the input device and the support pad of the input device assembly as shown in FIG. 1 and taken along the line C-C.

An input device assembly with a support pad according to a first embodiment of the present invention will be illustrated with reference to FIGS. 1 to 8. FIG. 1 is a schematic perspective view illustrating an input device assembly with a support pad according to a first embodiment of the present invention. FIG. 2 is a schematic perspective view illustrating the input device assembly as shown in FIG. 1, in which the support pad is shifted by 20 degrees in the clockwise direction and attached on the input device. FIG. 3 is a schematic perspective view illustrating the input device assembly as shown in FIG. 1, in which the support pad is shifted by 20 degrees in the counterclockwise direction and attached on the input device. FIG. 4 is a schematic perspective view illustrating the input device assembly as shown in FIG. 1, in which the support pad is separated from the input device and taken along a viewpoint. FIG. 5 is a schematic perspective view illustrating the input device assembly as shown in FIG. 1, in which the support pad is separated from the input device and taken along another viewpoint. FIG. 6 is a schematic cross-sectional view illustrating portions of the input device and the support pad of the input device assembly as shown in FIG. 1 and taken along the line A-A. FIG. 7 is a schematic cross-sectional view illustrating portions of the input device and the support pad of the input device assembly as shown in FIG. 1 and taken along the line B-B. FIG. 8 is a schematic cross-sectional view illustrating portions of the input device and the support pad of the input device assembly as shown in FIG. 1 and taken along the line C-C.

In this embodiment, the input device assembly comprises a support pad 1 and an input device 2. The support pad 1 comprises a first main body 11 and a first magnetic attraction element 12. The first main body 11 has a first bottom surface 111 and a first curvy surface 112. The input device 2 comprises a second main body 21 and at least one second magnetic attraction element 22. The second main body 21 has a second bottom surface 211 and a second curvy surface 212.

Structurally, the first curvy surface 112 of the first main body 11 of the support pad 1 and the second curvy surface 212 of the second main body 21 of the input device 2 match each other. That is, the first curvy surface 112 and the second curvy surface 212 are in a complementary relationship, e.g., in a convex-concave relationship. In addition, the area or coverage region of the second curvy surface 212 is larger than the area or coverage region of the first curvy surface 112. Consequently, the first curvy surface 112 of the support pad 1 can be contacted with one of plural portions of the second curvy surface 212 of the input device 2. Due to this structural design, the first curvy surface 112 of the support pad 1 is movable along the second curvy surface 212 of the input device 2. When the first curvy surface 112 of the support pad 1 is moved along the second curvy surface 212 of the input device 2, the relative angle or position between the support pad 1 and the input device 2 is correspondingly adjusted.

FIGS. 1, 2 and 3 are schematic perspective views illustrating the relationships between the support pad and the input device at different angles. As shown in FIG. 1, the support pad is directly aligned with the input device. As shown in FIG. 2, the support pad is shifted by 20 degrees in the clockwise direction and attached on the input device. This shifted arrangement is suitable for the right-handed user to operate the input device. As shown in FIG. 3, the support pad is shifted by 20 degrees in the counterclockwise direction and attached on the input device. This shifted arrangement is suitable for the left-handed user to operate the input device. The shifted angle is presented herein for purpose of illustration and description only. That is, the shifted angle may be varied according to the practical requirements.

In the input device assembly of this embodiment, the first magnetic attraction element 12 of the support pad 1 is a magnet or a magnetic conductor, and the second magnetic attraction element 22 of the input device 2 is also a magnet or a magnetic conductor. The magnetic conductor can be selected from the object containing metals such as iron, nickel or cobalt. For example, the magnetic conductor is an iron sheet. In an embodiment, the first magnetic attraction element 12 is a magnet 12A, and the second magnetic attraction element 22 is a magnetic conductor 22A.

In accordance with a feature of the present invention, the relative angle between the support pad 1 and the input device 2 can be adjusted to a specified angle. Alternatively, in some embodiments, the relative angle between the support pad 1 and the input device 2 can be adjusted to any angle. The relative angle between the support pad 1 and the input device 2 is determined according to the types, sizes, installation regions, installation positions and numbers of the first magnetic attraction element of the support pad and the at least one second magnetic attraction element of the input device.

Please refer to FIGS. 6, 7 and 8. The magnet 12A is disposed within the first main body 11 of the support pad 1. The magnetic conductor 22A is disposed within the second main body 21 of the input device 2. Due to the magnetic attraction between the magnet 12A and the magnetic conductor 22A, the support pad 1 and the input device 2 can closely contacted with each other and not separated from each other. In an embodiment, the second magnetic attraction element 22 (i.e., the magnetic conductor 22A) of the input device 2 is disposed on the inner side of the second curvy surface 212. The second magnetic attraction element 22 (i.e., the magnetic conductor 22A) has a curvy profile. In addition, the size and the coverage range of the second magnetic attraction element 22 (i.e., the magnetic conductor 22A) are larger than the size and the coverage range of the first magnetic attraction element 12 (i.e., the magnet 12A). Consequently, the first magnetic attraction element 12 can be magnetically attracted on one of plural portions of the second magnetic attraction element 22. Due to this structural design, the relative angle between the support pad 1 and the input device 2 can be adjusted to any desired angle. That is, the relative angle between the support pad 1 and the input device 2 is not specified. For example, the support pad 1 is shifted by 20 degrees in the counterclockwise direction, and the position of the support pad 1 as shown in FIG. 7 is changed to the position of the support pad 1 as shown in FIG. 8.

In case that the at least one second magnetic attraction element 22 of the input device 2 comprises plural small magnetic conductors 22A, the relative angle between the support pad 1 and the input device 2 can be adjusted to one of plural specified angles. These magnetic conductors 22A are substantially located at the same level. Moreover, these magnetic conductors 22A are discretely arranged along a curvy path in order to match the shape of the second curvy surface 212. When the magnet 12A of the support pad 1 and one of the plural magnetic conductors 22A of the input device 2 are magnetically attracted by each other, the user may feel a stepped feedback and sense that the support pad 1 is ready to be fixed on the input device 2 (or has been fixed on the input device 2) at a specified angle or position.

In an embodiment, the first main body 11 of the support pad 1 further comprises a first alignment mark 115. The first alignment mark 115 corresponds to the installation position of the first magnetic attraction element 12. For example, the first magnetic attraction element 12 is disposed within the first main body 11 and located near or beside the first alignment mark 115. Similarly, the second main body 21 of the input device 2 further comprises plural second alignment marks 215. In the embodiment as shown in FIGS. 1, 2, 3 and 4, the second main body 21 of the input device 2 further comprises three second alignment marks 215A, 215B and 215C. In addition, the angle between every two adjacent ones of the three second alignment marks 215A, 215B and 215C is 20 degrees. For example, the first alignment mark 115 and the second alignment marks 215A, 215B and 215C are symbols, pictures or texts. Due to the visual aid of the first alignment mark 115 and the plural second alignment marks 215, the user can clearly understand the relative angle or position between the support pad 1 and the input device 2 when the support pad 1 is moved to or combined with the input device 2.

In case that the input device 2 comprises plural second magnetic attraction elements 22, the plural second magnetic attraction elements 22 correspond to the plural second alignment marks 215. For example, the plural second magnetic attraction elements 22 are disposed within the second main body 21. In addition, the plural second magnetic attraction elements 22 are respectively located near or beside the second alignment marks 215A, 215B and 215C.

Please refer to FIGS. 1, 4, 5 and 6. As mentioned above, the support pad 1 comprises the first magnetic attraction element 12, and the input device 2 comprises the at least one second magnetic attraction element 22. Consequently, the support pad 1 and the input device 2 are not separated from each other. For securely combining the support pad 1 and the input device 2 together, the bottom side of the support pad 1 further comprises a hook 113, and the bottom side of the input device 2 correspondingly comprises a guiding groove 213. The hook 113 is protruded externally from the first bottom surface 111 of the support pad 1. Moreover, a salient structure 1131 is formed on a surface of the hook 113 away from the first bottom surface 111. The guiding groove 213 is inwardly and concavely formed in the second bottom surface 211 of the input device 2. In addition, the guiding groove 213 has a curvy profile in order to match the adjusted angle between the support pad 1 and the input device 2. When the support pad 1 and the input device 2 are combined together, the first bottom surface 111 of the support pad 1 and the second bottom surface 211 of the input device 2 are in contact with the same plane (e.g., a table plane). Meanwhile, the hook 113 is inserted into the guiding groove 213. In addition, the salient structure 1131 is only permitted to be moved within the range of the guiding groove 213. Consequently, the purpose of avoiding the separation of the support pad 1 and the input device 2 from each other can be achieved.

Figure 9:
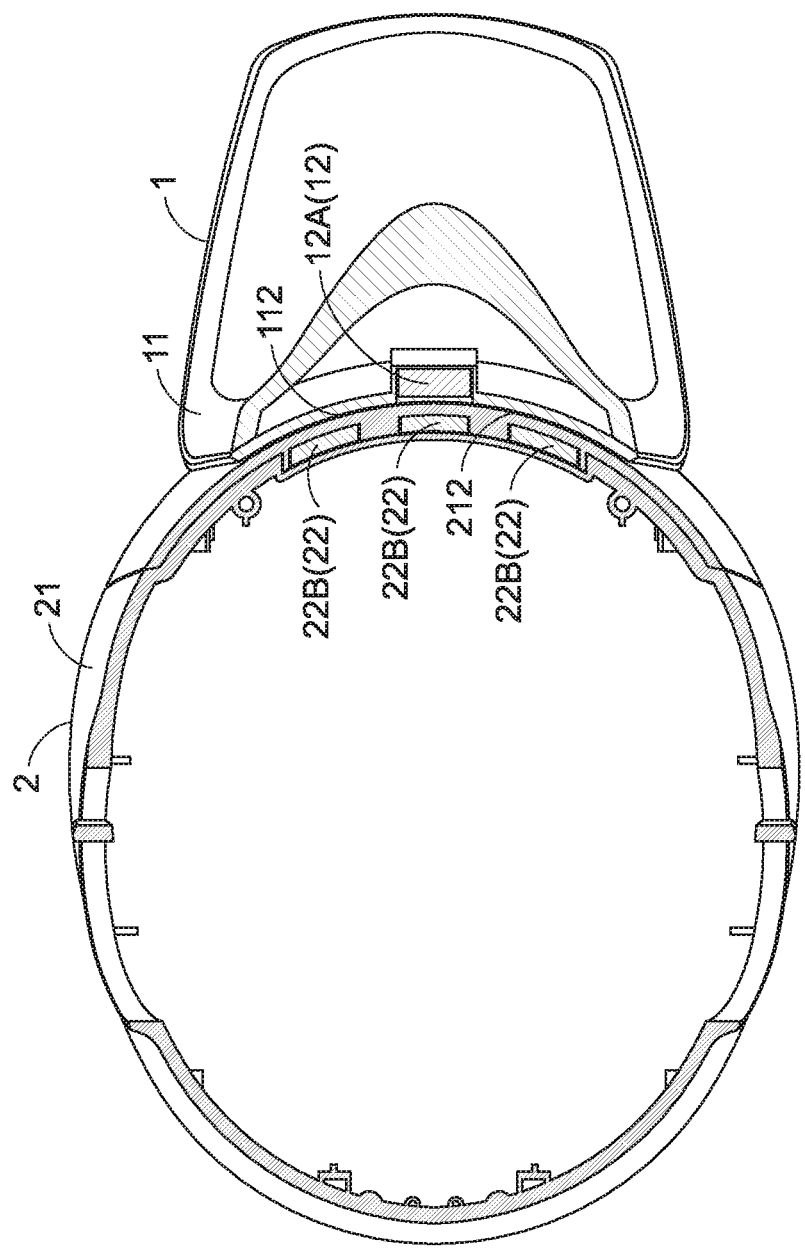
FIG. 9 is a schematic cross-sectional view illustrating an input device assembly with a support pad according to a second embodiment of the present invention.

FIG. 9 is a schematic cross-sectional view illustrating an input device assembly with a support pad according to a second embodiment of the present invention. In comparison with the first embodiment, the at least one second magnetic attraction element of the input device in the input device assembly of this embodiment comprises plural magnets. The other components of the input device assembly of this embodiment are similar to those of the first embodiment, and not redundantly described herein.

In this embodiment, the at least one second magnetic attraction element 22 of the input device 2 comprises the plural magnets 22B. These magnets 22B are substantially located at the same level. Moreover, these magnets 22B are arranged along a curvy path in order to match the shape of the second curvy surface 212. In this embodiment, the input device 2 comprises three magnets 22B. It is noted that the number of the magnets 22B is not restricted. Correspondingly, the first magnetic attraction element 12 of the support pad 1 is a magnet or a magnetic conductor. In this embodiment, the first magnetic attraction element 12 is a magnet 12A.

The magnet 22B of the input device 2 and the magnet 12A of the support pad 1 comply with the unlike-pole attraction relationship. In an example, the N pole of the magnet 22B faces the support pad 1, and the S pole of the magnet 12A faces the input device 2. Alternatively, the S pole of the magnet 22B faces the support pad 1, and the N pole of the magnet 12A faces the input device 2. When the magnet 12A of the support pad 1 and one of the plural magnets 22B of the input device 2 are magnetically attracted by each other, a specified relative angle or position between the support pad 1 and the input device 2 can be maintained.

Moreover, the plural magnets 22B of the input device 2 are discretely arranged along a curvy path in order to match the shape of the second curvy surface 212. Preferably, the plural magnets 22B are arranged along the second curvy surface 212 in an equal-angle distribution. For example, as shown in FIG. 9, the angle between every two adjacent ones of the magnets 22B is 20 degrees. In other words, the support pad 1 is movable along the second curvy surface 212 of the input device 2 by 20 degrees. When the magnet 12A and one of the plural magnets 22B of the input device 2 are magnetically attracted by each other, the specified relative angle or position between the support pad 1 and the input device 2 can be maintained. Moreover, when the magnet 12A of the support pad 1 and one of the plural magnets 22B of the input device 2 are magnetically attracted by each other, the user may feel a stepped feedback and sense that the support pad 1 is fixed on the input device 2 at a specified angle or position.

Figure 10:
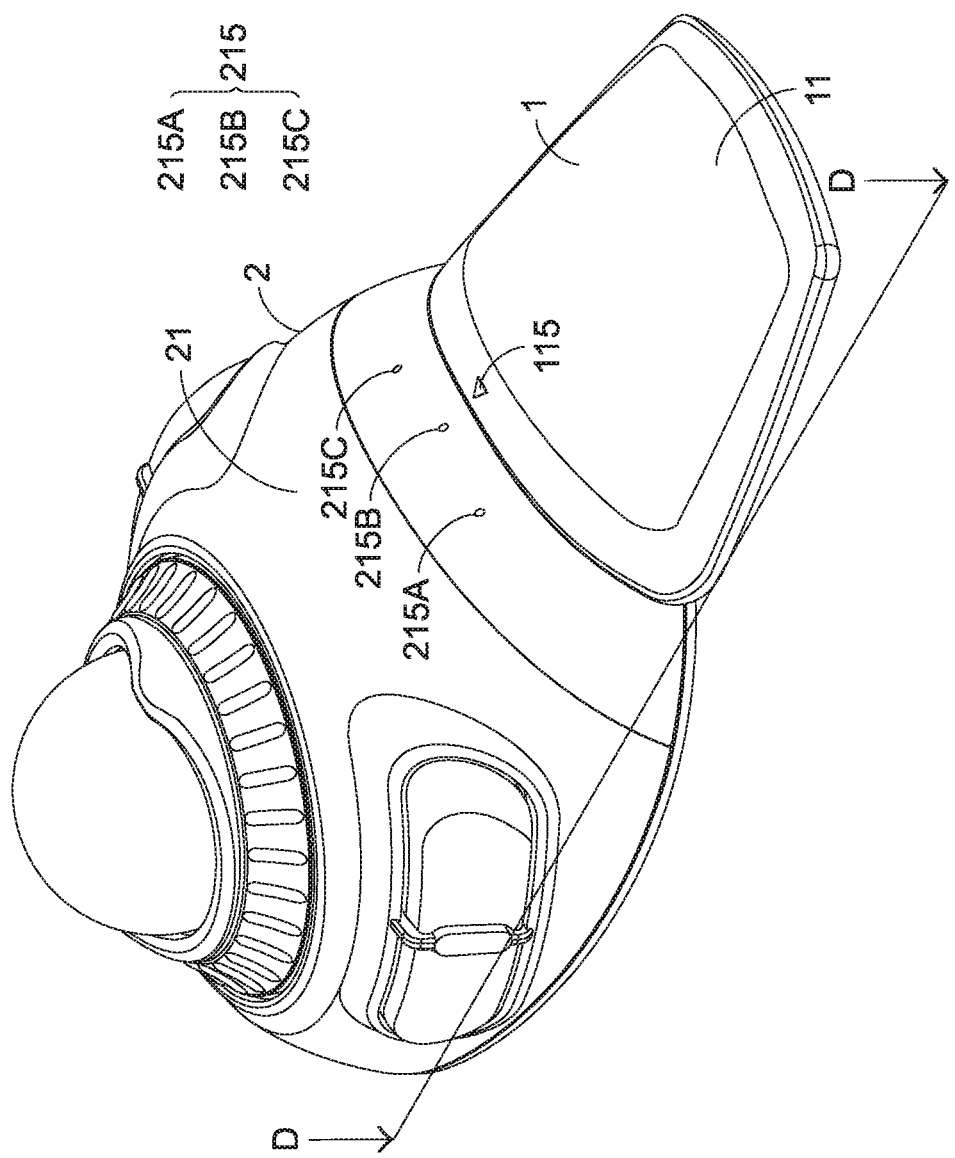
FIG. 10 is a schematic perspective view illustrating an input device assembly with a support pad according to a third embodiment of the present invention.
Figure 11:
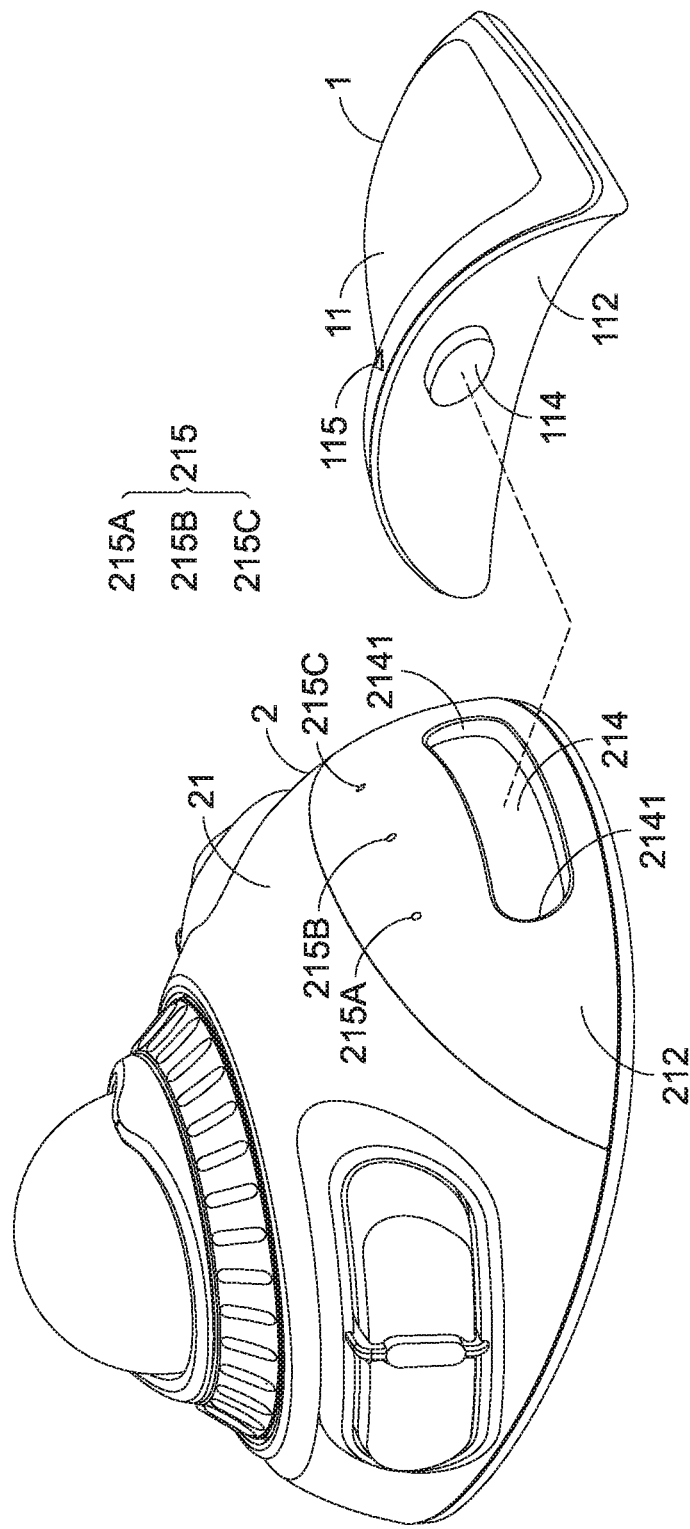
FIG. 11 is a schematic perspective view illustrating the input device assembly as shown in FIG. 10, in which the support pad is separated from the input device.
Figure 12:
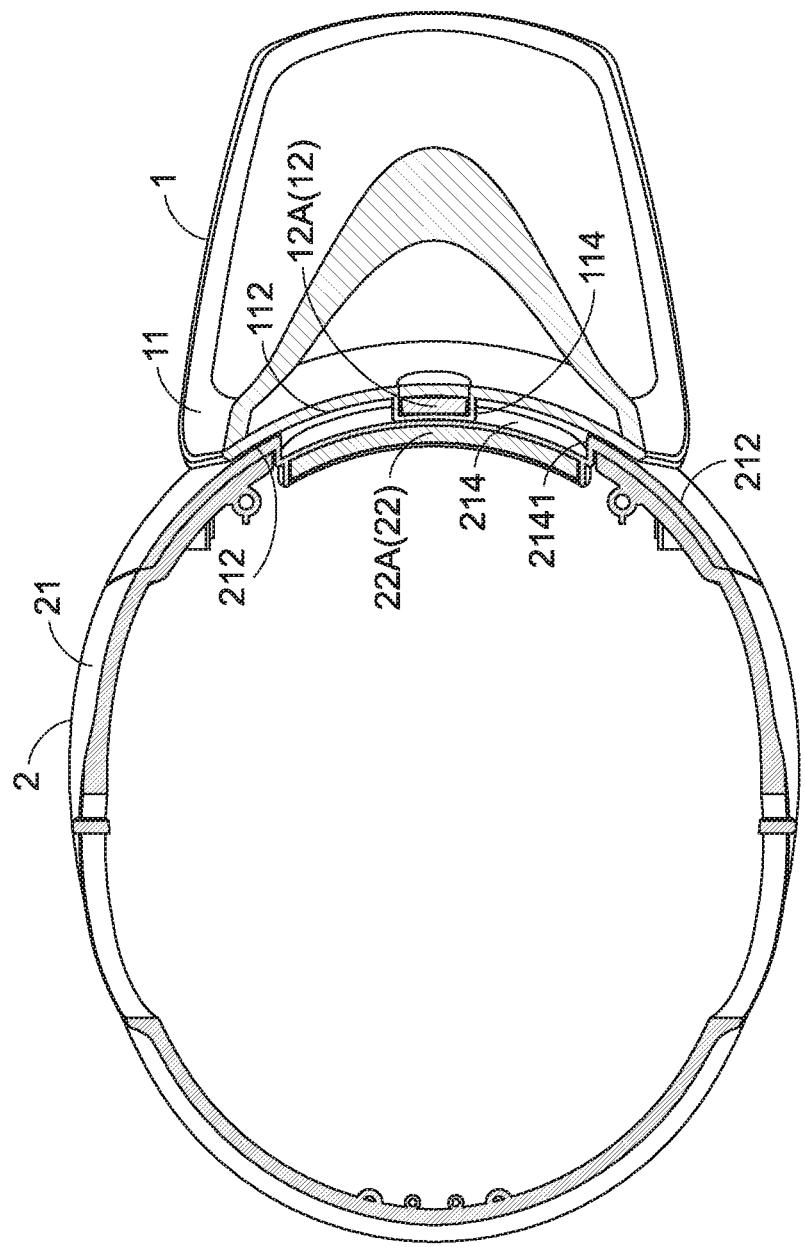
FIG. 12 is a schematic cross-sectional view illustrating portions of the input device and the support pad of the input device assembly as shown in FIG. 10 and taken along the line D-D.

FIG. 10 is a schematic perspective view illustrating an input device assembly with a support pad according to a third embodiment of the present invention. FIG. 11 is a schematic perspective view illustrating the input device assembly as shown in FIG. 10, in which the support pad is separated from the input device. FIG. 12 is a schematic cross-sectional view illustrating portions of the input device and the support pad of the input device assembly as shown in FIG. 10 and taken along the line D-D. In comparison with the first embodiment and the second embodiment, the support pad of the input device assembly of this embodiment is further equipped with a protrusion post, and a guiding groove is correspondingly formed in the second curvy surface of the input device. The cooperation of the protrusion post and the guiding groove can assist the user to adjust the relative angle between the support pad and the input device. The other components of the input device assembly of this embodiment are similar to those of the first embodiment and the second embodiment, and not redundantly described herein.

Please refer to FIGS. 10, 11 and 12. The support pad 1 further comprises a protrusion post 114. The protrusion post 114 is protruded externally from the first curvy surface 112. Moreover, the first magnetic attraction element 12 is disposed within or buried within the protrusion post 114 of the support pad 1. Correspondingly, the input device 2 further comprises a guiding groove 214. The guiding groove 214 is inwardly and concavely formed in the second curvy surface 212. In other words, the guiding groove 214 has a curvy concave structure. The at least one second magnetic attraction element 22 is disposed within or buried within the inner side of the guiding groove 214 of the input device 2. The protrusion post 114 of the support pad 1 can be inserted into the guiding groove 214 of the input device 2. In addition, the protrusion post 114 is movable within the guiding groove 214 in the clockwise direction or the counterclockwise direction.

In the input device assembly of this embodiment, the first magnetic attraction element 12 of the support pad 1 is a magnet or a magnetic conductor, and the second magnetic attraction element 22 of the input device 2 is also a magnet or a magnetic conductor. The magnetic conductor can be selected from the object containing metals such as iron, nickel or cobalt. For example, the magnetic conductor is an iron sheet. In an embodiment, the first magnetic attraction element 12 is a magnet 12A, and the second magnetic attraction element 22 is a magnetic conductor 22A.

When the first magnetic attraction element 12 and the second magnetic attraction element 22 are magnetically attracted by each other, the support pad 1 and the input device 2 can be in close contact with each other. In addition, the protrusion post 114 of the support pad 1 can be within the guiding groove 214 of the input device 2. The cooperation of the protrusion post 114 and the guiding groove 214 can assist the user to adjust the relative angle between the support pad 1 and the input device 2 in a more intuitive manner.

Moreover, two stopping structures 2141 are respectively formed on the two ends of the guiding groove 214 of the input device 2. The arrangement of the stopping structures 2141 can limit the movable range of the protrusion post 114. Consequently, the stopping structures 2141 have the stopping and positioning functions. Consequently, through the stopping structures 2141, the user can obviously sense that the support pad 1 has been moved to the limited position while the support pad 1 is adjusted.

In addition, the size and the coverage range of the second magnetic attraction element 22 (i.e., the magnetic conductor 22A) are larger than the size and the coverage range of the first magnetic attraction element 12 (i.e., the magnet 12A). Consequently, the first magnetic attraction element 12 can be magnetically attracted on one of plural portions of the second magnetic attraction element 22. Due to this structural design, the relative angle between the support pad 1 and the input device 2 can be adjusted to any desired angle. That is, the relative angle between the support pad 1 and the input device 2 is not specified.

In case that the at least one second magnetic attraction element 22 of the input device 2 comprises plural small magnetic conductors 22A, the relative angle between the support pad 1 and the input device 2 can be adjusted to one of plural specified angles. These magnetic conductors 22A are substantially located at the same level. Moreover, these magnetic conductors 22A are discretely arranged along a curvy path in order to match the shape of the guiding groove 214. When the magnet 12A of the support pad 1 and one of the plural magnetic conductors 22A of the input device 2 are magnetically attracted by each other, the user may feel a stepped feedback and sense that the support pad 1 is ready to be fixed on the input device 2 (or has been fixed on the input device 2) at a specified angle or position.

Figure 13:
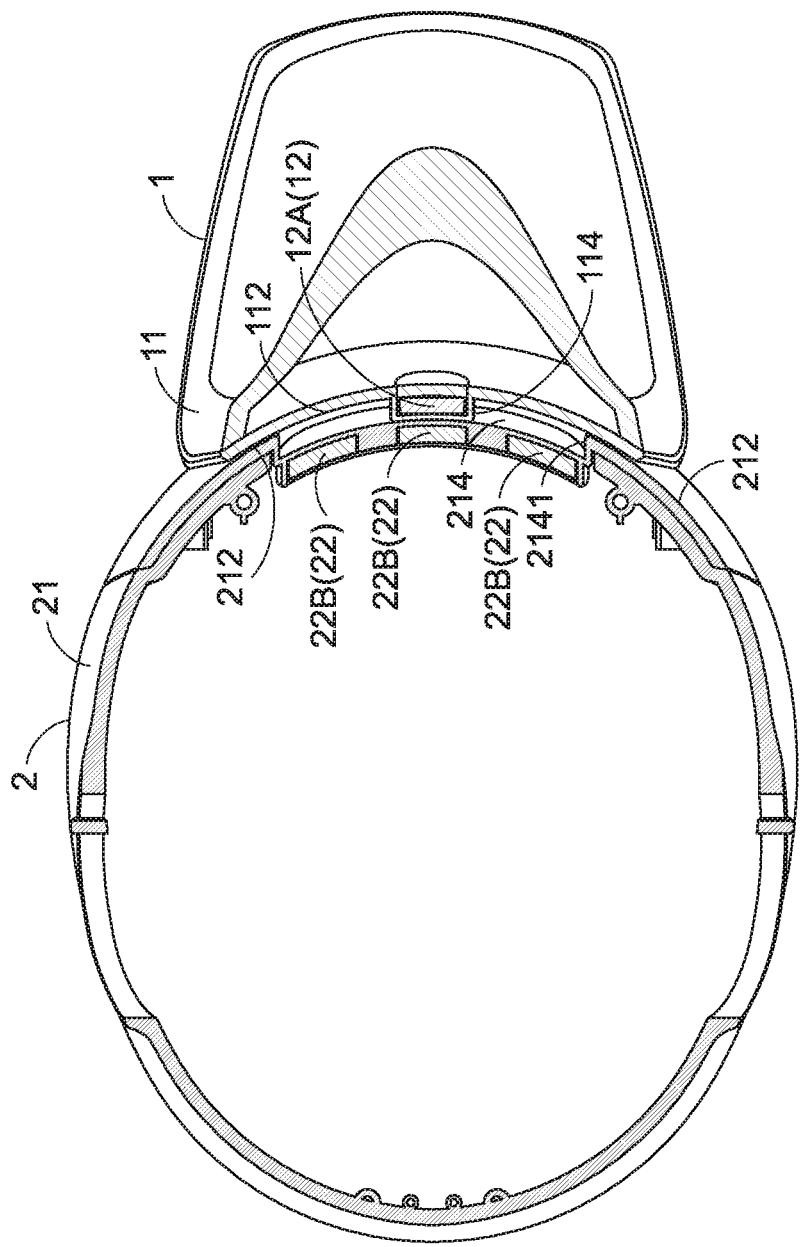
FIG. 13 is a schematic cross-sectional view illustrating an input device assembly with a support pad according to a fourth embodiment of the present invention.

FIG. 13 is a schematic cross-sectional view illustrating an input device assembly with a support pad according to a fourth embodiment of the present invention. In comparison with the third embodiment, the at least one second magnetic attraction element of the input device in the input device assembly of this embodiment comprises plural magnets. The other components of the input device assembly of this embodiment are similar to those of the third embodiment, and not redundantly described herein.

In this embodiment, the at least one second magnetic attraction element 22 of the input device 2 comprises the plural magnets 22B. These magnets 22B are substantially located at the same level. Moreover, these magnets 22B are arranged along a curvy path in order to match the shape of the second curvy surface 212. In this embodiment, the input device 2 comprises three magnets 22B. It is noted that the number of the magnets 22B is not restricted. Correspondingly, the first magnetic attraction element 12 of the support pad 1 is a magnet or a magnetic conductor. In this embodiment, the first magnetic attraction element 12 is a magnet 12A.

The magnet 22B of the input device 2 and the magnet 12A of the support pad 1 comply with the unlike-pole attraction relationship. For example, in an example, the N pole of the magnet 22B faces the support pad 1, and the S pole of the magnet 12A faces the input device 2. Alternatively, the S pole of the magnet 22B faces the support pad 1, and the N pole of the magnet 12A faces the input device 2. When the magnet 12A of the support pad 1 and one of the plural magnets 22B of the input device 2 are magnetically attracted by each other, a specified relative angle or position between the support pad 1 and the input device 2 can be maintained.

Moreover, the plural magnets 22B of the input device 2 are discretely arranged along a curvy path in order to match the shape of the guiding groove 214. Preferably, the plural magnets 22B are arranged along the guiding groove 214 in an equal-angle distribution.

For example, as shown in FIG. 13, the angle between every two adjacent ones of the magnets 22B is 20 degrees. In other words, the support pad 1 is movable along the guiding groove 214 of the input device 2 by 20 degrees. When the magnet 12A and one of the plural magnets 22B of the input device 2 are magnetically attracted by each other, the specified relative angle or position between the support pad 1 and the input device 2 can be maintained. Moreover, when the magnet 12A of the support pad 1 and one of the plural magnets 22B of the input device 2 are magnetically attracted by each other, the user may feel a stepped feedback and sense that the support pad 1 is fixed on the input device 2 at a specified angle or position.

The input device of the present invention can be selected from a mouse, a trackball, a joystick and a controller. In addition, the controller is a drawing controller or an audio-visual editing controller.

The direction terms mentioned in the present invention, such as "upper", "lower", "inner", "outer", "side", etc., are only the directions for referring to the attached drawings. Therefore, the directional terms are used to describe and understand the present invention, not to limit the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An input device assembly, comprising:
   a support pad comprising a first main body, a first magnetic attraction element, and a protrusion post, wherein the first main body has a first bottom surface and a first curvy surface, wherein the protrusion post is protruded externally from the first curvy surface, wherein the first magnetic attraction element is disposed within the protrusion post, and
   an input device comprising a second main body, at least one second magnetic attraction element, and a guiding groove, wherein the second main body has a second bottom surface and a second curvy surface, wherein the guiding groove is inwardly and concavely formed in the second curvy surface, and the protrusion post is movable within the guiding groove, and the at least one second magnetic attraction element is disposed within an inner side of the second main body and located near the guiding groove,
   wherein the first curvy surface of the support pad is contactable with one of plural portions of the second curvy surface of the input device, and the first magnetic attraction element and one of the at least one second magnetic attraction element are magnetically attracted by each other, so that the support pad is in close contact with the input device.

2. The input device assembly according to claim 1, wherein the at least one second magnetic attraction element of the input device comprises plural magnetic attraction elements, and the plural magnetic attraction elements are arranged along a curvy profile.

3. The input device assembly according to claim 2, wherein the first magnetic attraction element is a magnet, and each of the plural second magnetic attraction elements is another magnet or a magnetic conductor.

4. The input device assembly according to claim 1, wherein the first magnetic attraction element is a magnet, and each of the at least one second magnetic attraction element is a magnetic conductor, wherein the at least one second magnetic attraction element is disposed on an inner side of the second curvy surface, and the first magnetic attraction element and one of plural portions of the at least one second magnetic attraction element are magnetically attracted by each other.

5. The input device assembly according to claim 1, wherein the first magnetic attraction element is a magnet, and each of the at least one second magnetic attraction element is another magnet or a magnetic conductor.

6. The input device assembly according to claim 5, wherein the first magnetic attraction element is the magnet, and each of the at least one second magnetic attraction element is the magnetic conductor, wherein the at least one second magnetic attraction element is disposed within an inner side of the guiding groove, and the first magnetic attraction element and one of plural portions of the at least one second magnetic attraction element are magnetically attracted by each other.

7. The input device assembly according to claim 1, wherein two stopping structures are respectively formed on the two ends of the guiding groove, and a movable range of the protrusion post within the guiding groove is limited by the stopping structures.

8. The input device assembly according to claim 1, wherein the first main body of the support pad further comprises a first alignment mark, and the second main body of the input device further comprises plural second alignment marks.

9. The input device assembly according to claim 8, wherein the at least one second magnetic attraction element of the input device comprises plural magnetic attraction elements, and the plural magnetic attraction elements are respectively aligned with the corresponding second alignment marks.

10. The input device assembly according to claim 9, wherein the first magnetic attraction element is a magnet, and each of the at least one second magnetic attraction element is another magnet or a magnetic conductor.

11. An input device assembly, comprising:
- a support pad comprising a first main body and a first magnetic attraction element, wherein the first main body has a first bottom surface, a first curvy surface, and a first alignment mark; and
- an input device comprising a second main body and at least one second magnetic attraction element, wherein the second main body has a second bottom surface, a second curvy surface, and plural second alignment marks, wherein the at least one second magnetic attraction element of the input device comprises plural magnetic attraction elements, and the plural magnetic attraction elements are respectively aligned with the corresponding second alignment marks, wherein the first curvy surface of the support pad is contactable with one of plural portions of the second curvy surface of the input device, and the first magnetic attraction element and one of the at least one second magnetic attraction element are magnetically attracted by each other, so that the support pad is in close contact with the input device.

12. The input device assembly according to claim 11, wherein the first magnetic attraction element is a magnet, and each of the at least one second magnetic attraction element is another magnet or a magnetic conductor.

\* \* \* \* \*